Figure 1:
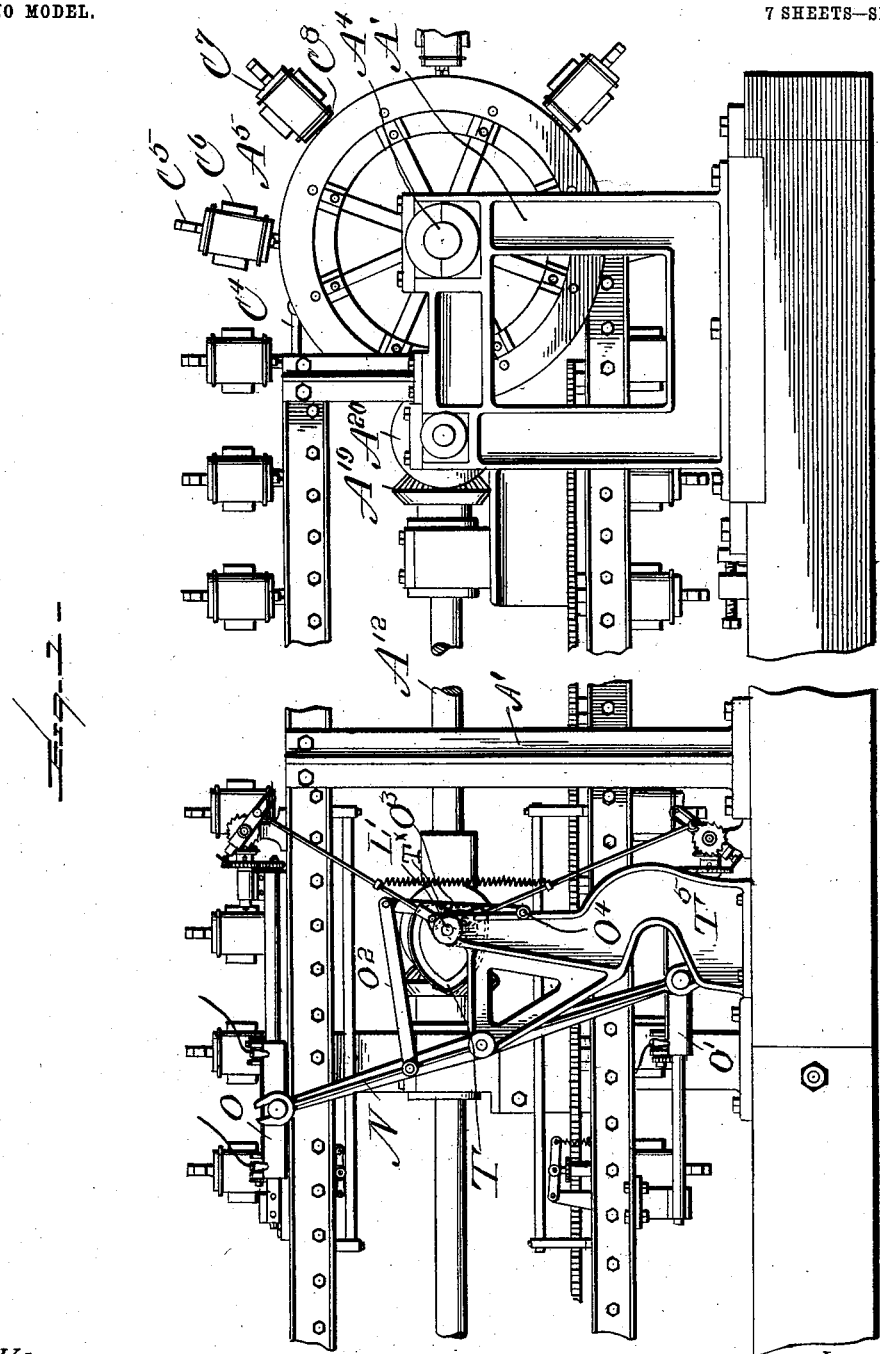

No. 754,701. PATENTED MAR. 15, 1904.
J. G. & M. O. REHFUSS.
CAN MAKING MACHINE.
APPLICATION FILED MAY 29, 1902. RENEWED JAN. 4, 1904.
NO MODEL. 7 SHEETS—SHEET 1.

WITNESSES:
Wm F. Doyle
A. L. ...

INVENTORS
John G. Rehfuss and M. O. Rehfuss
BY Franklin H. Hough
Attorney

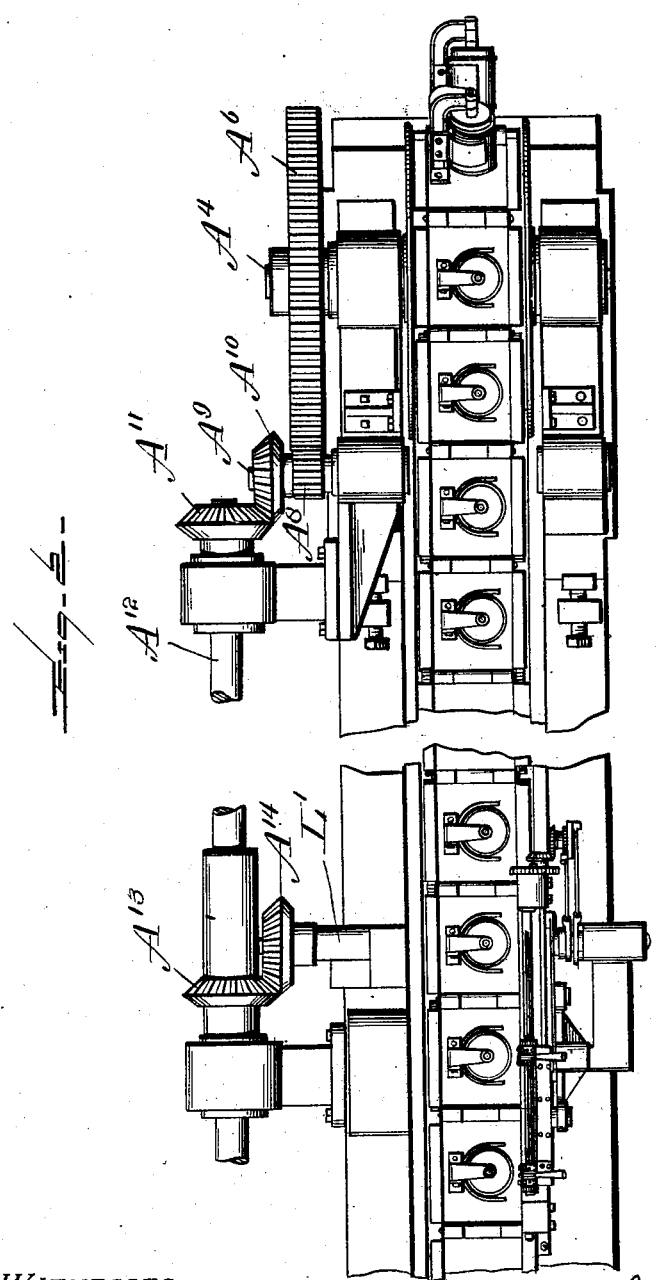

No. 754,701. PATENTED MAR. 15, 1904.
J. G. & M. O. REHFUSS.
CAN MAKING MACHINE.
APPLICATION FILED MAY 29, 1902. RENEWED JAN. 4, 1904.
NO MODEL. 7 SHEETS—SHEET 3.
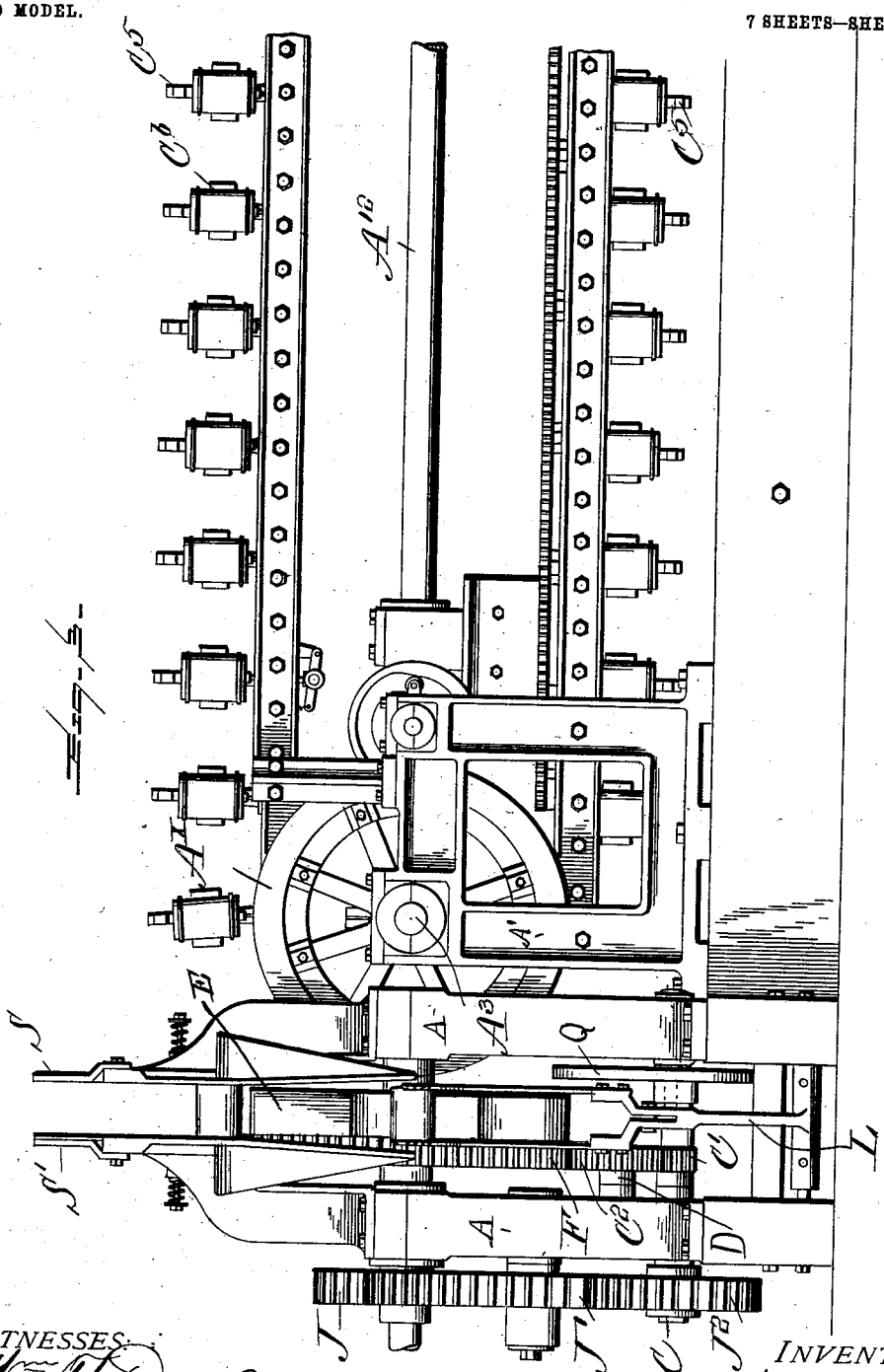
WITNESSES:
Wm. F. Doyle
A. L. Haug
INVENTORS
John G. Rehfuss and M. O. Rehfuss
By Franklin N. Hough
Attorney No. 754,701. PATENTED MAR. 15, 1904.
J. G. & M. O. REHFUSS.
CAN MAKING MACHINE.
APPLICATION FILED MAY 29, 1902. RENEWED JAN. 4, 1904.
NO MODEL. 7 SHEETS—SHEET 4.
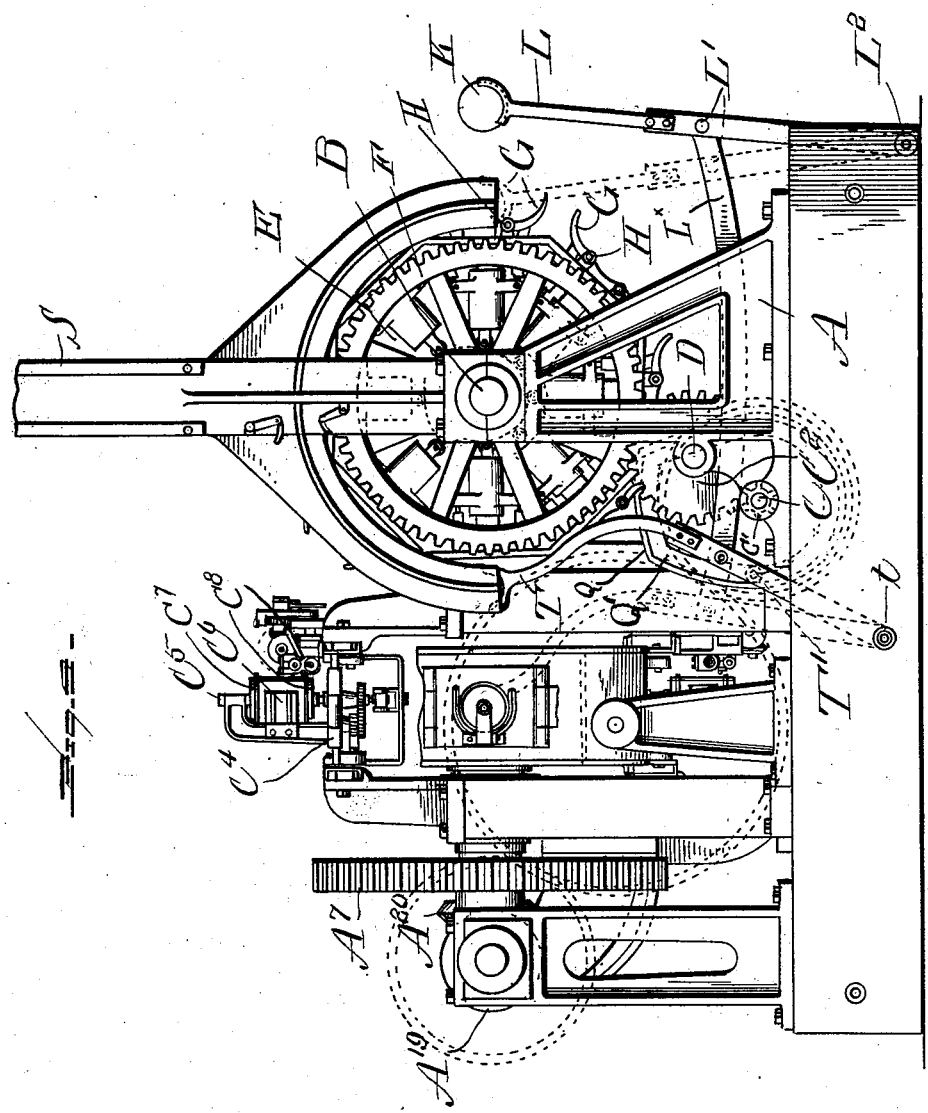

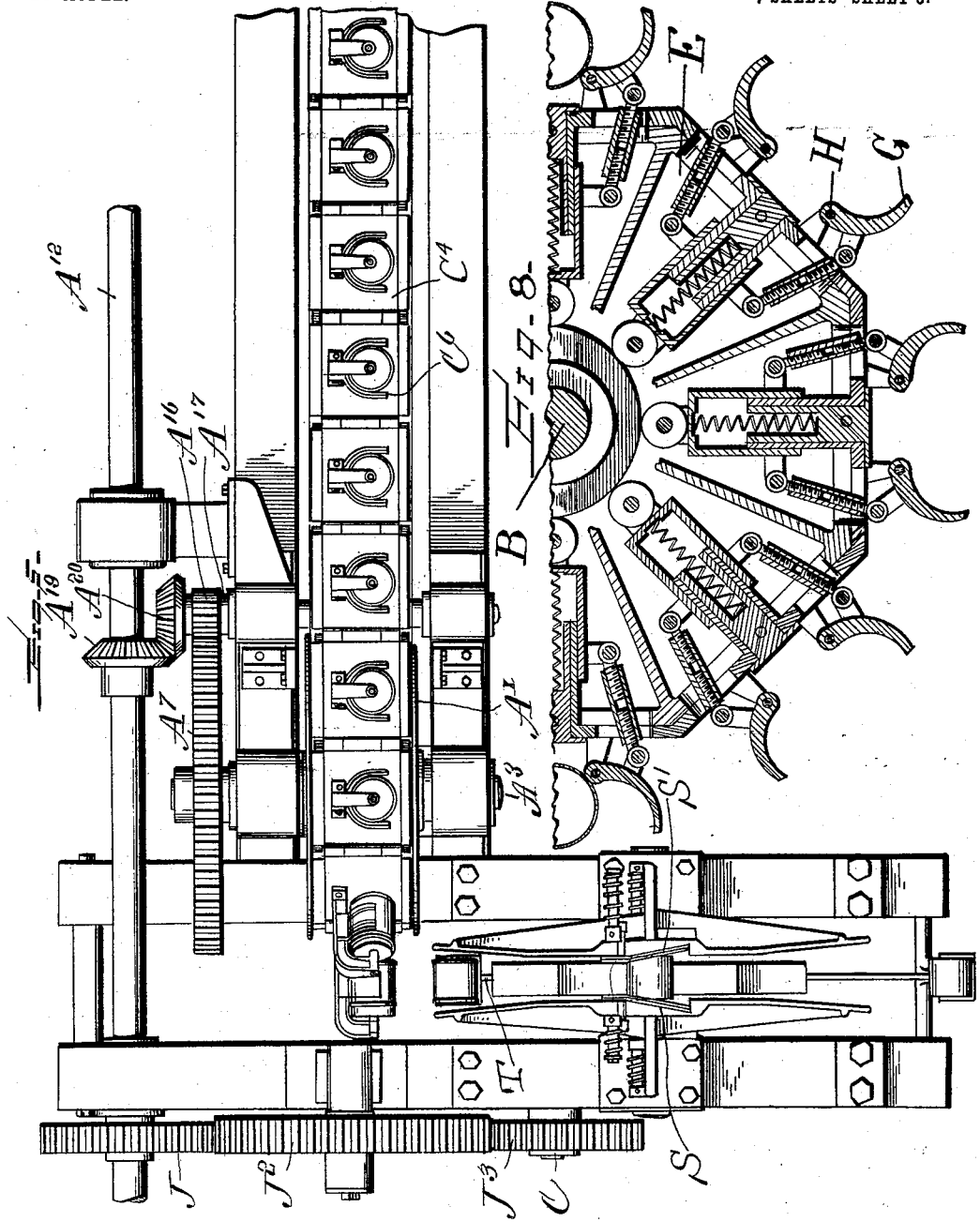

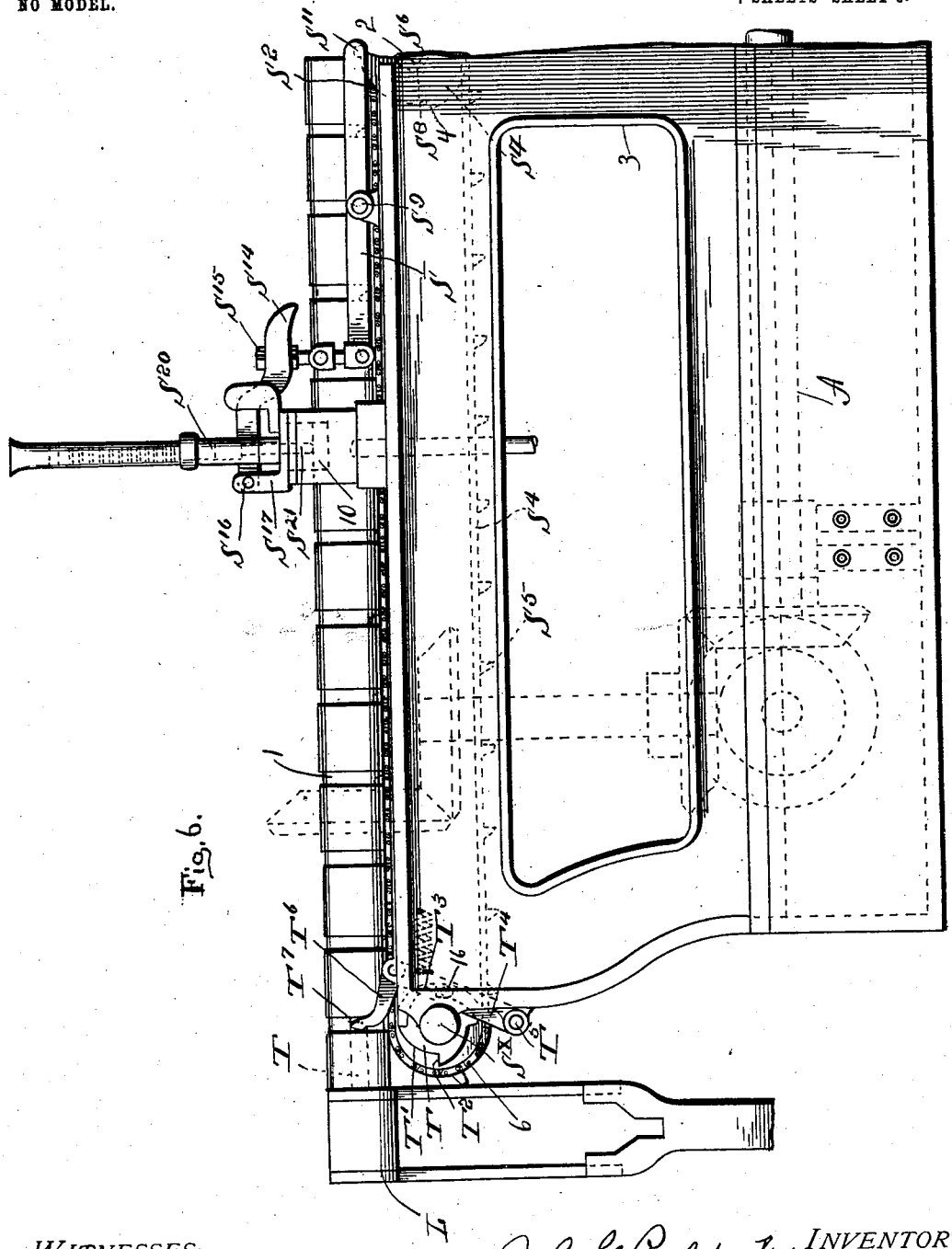

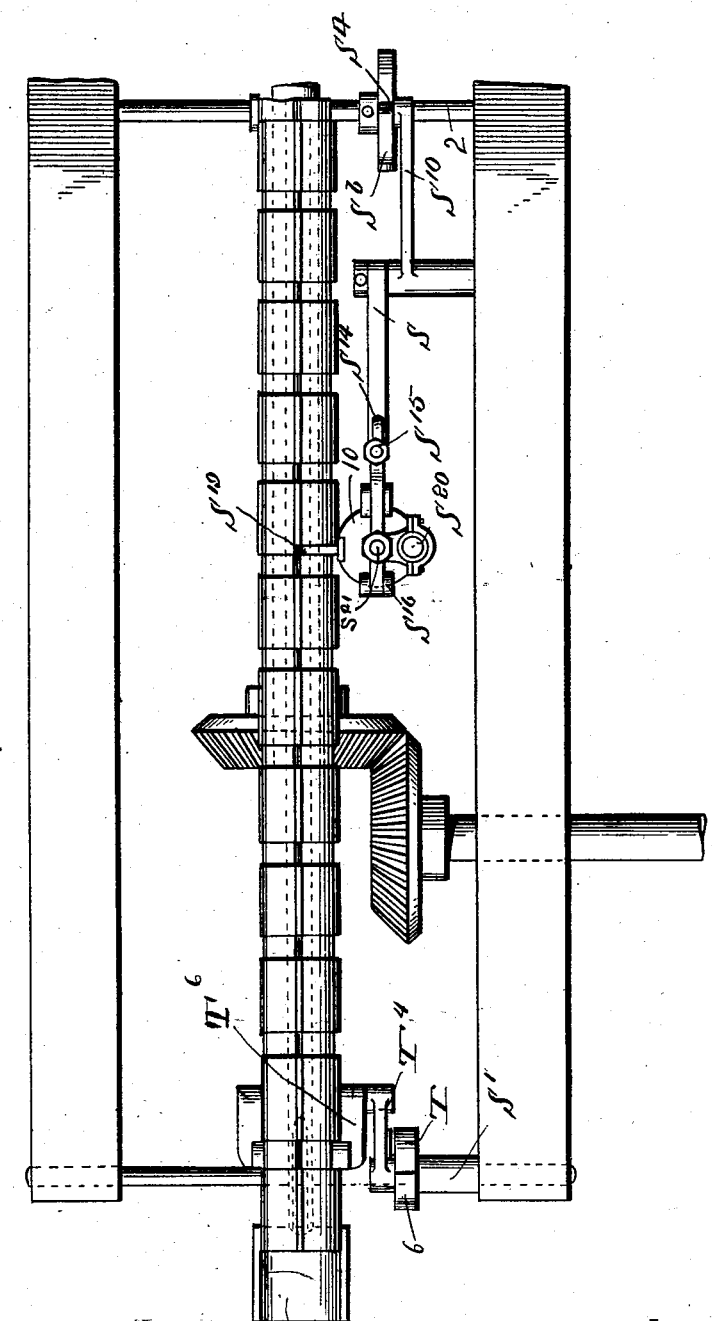

No. 754,701. Patented March 15, 1904.

UNITED STATES PATENT OFFICE.

JOHN G. REHFUSS AND MARTIN O. REHFUSS, OF PHILADELPHIA, PENNSYLVANIA, ASSIGNORS TO THE BUREAU CAN AND MANUFACTURING COMPANY, OF DELAWARE.

CAN-MAKING MACHINE.

SPECIFICATION forming part of Letters Patent No. 754,701, dated March 15, 1904.

Application filed May 29, 1902. Renewed January 4, 1904. Serial No. 187,740. (No model.)

*To all whom it may concern:*

Be it known that we, JOHN G. REHFUSS and MARTIN O. REHFUSS, citizens of the United States, residing at Philadelphia, in the county of Philadelphia and State of Pennsylvania, have invented certain new and useful Improvements in Can-Making Machinery; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in can-making machines in which provision is made for transferring the body portions of cans from a former to a mechanism for applying the tops and bottoms thereto and in the provision of means for transferring the can after the top and bottom have been applied thereto to another part of the machine in which the tops and bottoms are soldered and the entire mechanism being operated automatically and in such manner that the cans are fed from one part of the machine to the other without any interference one with the other.

In carrying out our invention we have provided the transferring mechanism which is automatically operated and provided for the purpose of transferring the cans during different stages of their manufacture from the machine covered by our application Serial No. 104,870 to mechanism covered by our application Serial No. 97,907 for improvements in machines for putting tops and bottoms on cans, thence to mechanism where the tops and bottoms are soldered to the body portions, as covered by our application Serial No. 96,273; and it consists in the various details of construction and combinations of parts, as will be hereinafter fully described and then specifically defined in the appended claims.

Our invention is illustrated in the accompanying drawings, which, with the letters of reference marked thereon, form a part of this application, and in which drawings similar letters and figures of reference indicate like parts in the several views, in which—

Figure 1 is a side elevation of a portion of our machine comprising the mechanism for soldering the tops and bottoms to the body portions of cans, portions of the mechanism being broken away, said view showing a sprocket-wheel over which the endless carrier travels and the mechanism for operating the soldering apparatus. Fig. 2 is a top plan view of the construction shown in Fig. 1. Fig. 3 is a side elevation of a portion of our machine for soldering tops and bottoms to the body portions of cans, and showing in edge elevation at the left the means for applying the tops and bottoms to the body portions of cans preparatory to their being soldered, the endless carrier shown in this view being a continuation of the carrier illustrated in Fig. 1. Fig. 4 is an end elevation of the mechanism illustrated in Fig. 3, showing in side elevation the mechanism for applying the tops and bottoms to the body portions of the cans, and the transferring means for feeding the body portion of the can to the part of the machine where the tops and bottoms are clapped over the body portions, and the transferring mechanism whereby the cans are carried to the mechanism for soldering the same. Fig. 5 is a top plan view of the construction shown in Fig. 3. Fig. 6 is a side elevation of the former about which the body portions of the cans are formed, and means for pushing the body portions off from the former to a transferring-arm, and Fig. 7 is a top plan view of the mechanism shown in Fig. 6. Fig. 8 is a cross-sectional view through the skeleton wheel, showing details of the invention in elevation.

Reference now being had to the details of the drawings by figures and letters of reference, 1 designates a former about which sheets of tin are bent to form the body portions of cans, and 2 designates a shaft journaled in the frame 3, and keyed to rotate with said shaft is a sprocket-wheel about which a sprocket-chain $S^4$ travels, which also travels about sprocket-wheel 6. On the links of said chain are lugs S⁵, provided for the purpose of feeding the body portions of cans forward on the former to be soldered by means of a solder-pump having a nozzle S¹⁹, through which molten solder is forced over the longitudinal seam of the can by means of the piston S²¹, forcing the solder out of the solder-receptacle 10, said piston being raised and lowered by means of a pivoted arm S¹⁴, which is actuated by link-and-lever connections with a rock-shaft S⁹, mounted on the frame of the machine and which rock-shaft is operated by means of an antifriction-roller S¹¹, traveling about the wheel S⁴, having its circumference made up of cam-segments, each segment terminating in a shoulder 4, only one of these shoulders being shown in Fig. 6 of the drawings, whereby as said wheel rotates a rocking motion is imparted to said shaft and through its connections to the plunger of the solder-pump, all of which construction is shown and described in our pending application, Serial No. 104,870, and hence further detailed description in the present application is deemed unnecessary.

Mounted at the rear end of the frame of the apparatus for forming the body portions of the cans is a spring-pressed arm T⁴, fixed to and adapted to rock with the shaft T⁵, said arm carrying an antifriction-roller 16, which is adapted to ride upon the convexed circumference of the elongated teeth or cam-surfaces of the sprocket-wheel rotating with the shaft S×. Pivoted to the upper end of said arm is a forked member T⁶, having two arms which are bent inwardly and rest in grooves or recesses longitudinally formed at locations diametrically opposite in the former. At each rotation of the shaft carrying the wheel S⁴, which wheel has four segment cams or teeth about its circumference, said forked member will be driven rearward or toward the soldering apparatus four times by the antifriction-roller 16, carried by the link T⁴, being held in contact with said cam-wheel, said member being returned to its normal position by any suitable means, as by a spring, and adapted in its forward throw to push a can-body off the end of a former or mandrel.

Referring to Figs. 4 and 5, it will be observed that an arm L is pivotally connected to the bottom of a supporting-frame at L², the upper end of which arm is adapted to receive the hollow can-body as it is pushed off the end of the former, which arm is designed for the purpose of conveying the body portion of a can to the portion of the apparatus illustrated in Fig. 4, where the top and bottom for the can are adapted to be applied to the latter.

In the drawings, A A designate the standards forming the part of the frame of the apparatus for applying the tops and bottoms to the body portions of the cans, upon which standards an operating-shaft B is mounted, and journaled in the lower portion of the frame is a shaft C, having a pinion C', (shown in Fig. 3,) which is in mesh with the gear-wheel C², journaled upon a stub-shaft D, which is mounted in one of the upright portions or standards A. Journaled on said shaft B, which is stationary, is the skeleton sprocket-wheel E, and mounted to rotate with said wheel E is a gear-wheel F, having teeth which are in mesh with the teeth of the gear-wheel C², as shown clearly in Figs. 3 and 4 of the drawings. In the drawings we have shown the skeleton wheel as octagonal-shaped in peripheral outline, each of the eight sections about the circumference of the skeleton wheel being adapted to carry a pair of clamping-jaws which are designed to grip the body portions of the cans as they are fed successively to the jaws by means of the conveying-arm, which will be presently described.

The clamping-jaws referred to comprise the two members G G, which are concaved out on their inner faces and convexed on their outer faces and pivoted at their inner ends on pins H, which are mounted on bracket-arms integral with the skeleton wheel. These jaws are actuated automatically by means which is fully described in detail in our application before referred to, Serial No. 97,907, and hence it is not thought necessary to repeat the description in this application. Suffice it to say that the jaws are so operated as to grip a can K, carried by an arm L, after the can has been deposited between the jaws preparatory to the can's receiving its top and bottom as it is carried by the skeleton wheel during a partial rotary movement thereof. In the drawings we have shown the chutes S and S', through which the tops and bottoms are fed to locations to be clapped over the ends of the body portions of the cans as they are successively fed past the lower ends of the chutes, disposed at a slight inclination to the travel of the skeleton wheel in order to present the tops and bottoms into proper positions to receive the body portions of the cans. After the body portions of the cans have received their tops and bottoms and when reaching a location substantially diametrically opposite the location where the body portions are fed to the jaws about the skeleton wheel the jaws are thrown from frictional engagement with the cans, and each can, with a top and bottom secured thereto, is deposited upon an arm T, which is substantially similar in construction to the arm L, before described. Upon the upper concaved end of said arm T the can, with the top and bottom thereon, is deposited and conveyed to the mechanism where the top and bottom are soldered to the body portion. The arm L is mounted upon a horizontal shaft L², the ends of which are journaled in the opposite side pieces of the frame, and said arm T is mounted in a similar manner on a shaft t. (Shown in Fig. 4 of the drawings.) Said arms L and T are connected by a bar L×, pivoted to each arm, and are operated in unison by means of an antifriction-wheel T', carried by the arm T. Mounted to rotate with the shaft C is a wheel Q, having a cam-groove Q' in one face thereof, in which groove said antifriction-wheel T' is adapted to travel.

After the tops and bottoms have been applied to the body portions of cans they are conveyed by the arm T singly to the part of the mechanism where the tops and bottoms are soldered, which mechanism is fully shown and described in our application Serial No. 96,273, which, in brief, comprises a standard A' and A', Figs. 1 and 3, in which shafts $A^3$ and $A^4$ are journaled, upon which sprocket-wheels $A^×$ and $A^5$ are mounted to rotate. Mounted to rotate with the shaft $A^3$ is a gear-wheel $A^7$, Fig. 5, which is driven by geared connection through wheels $A^{16}$, $A^{20}$, and $A^{19}$ with shaft $A^{12}$, while shaft $A^4$, Fig. 2, is geared to the same shaft $A^{12}$ through the intermeshing wheels $A^6$, $A^8$, $A^{10}$, and $A^{11}$. Said shaft $A^{12}$ is mounted in suitable bearings in the bracket-arms of the machine and carries keyed thereto a bevel-gear $A^{13}$, which is in mesh with the bevel-gear $A^{14}$, keyed to the end of a shaft L', which is adapted to drive the solder-feeding mechanism. Referring to Fig. 5 of the drawings, it will be noted that a pinion-wheel $A^{16}$, mounted on a stub-shaft $A^{17}$, conveys power to the gear-wheel $A^7$, which is provided to drive the sprocket-wheel $A^×$, about which the endless chain made up of links $C^4$ travels. Each of said links carries a yoke $C^5$, having guide-wings $C^6$, which are adapted to partially surround the can and hold the same between the clamping members $C^7$ and $C^8$, which automatically clamp against the tops and bottoms and hold the can, which is adapted to be rotated as it travels with the endless carrier. The soldering of the tops and bottoms is effected by the construction illustrated in Fig. 1 of the drawings, but more particularly described and illustrated in our application Serial No. 96,273, before referred to, and in which mechanism the bottoms of two cans are soldered upon the upper longitudinal portion of the carrier simultaneously with the soldering of the tops of two other cans on the opposite portion of the carrier.

The solder-conveying mechanism is illustrated in Fig. 1 by the carriages O and O', which are reciprocated by means of an oscillating lever N, which engages said carriages at its opposite ends. Said oscillating lever N is connected, by means of a link $O^2$, to a lever $O^3$, which is pivoted at $O^4$ to the standard $T^5$, said lever $O^3$ carrying an antifriction-wheel $T^×$, traveling in a groove of the cam T, which is mounted on and rotates with the shaft L'. By means of this cam-wheel it will be observed that the solder-carrying carriages are alternately reciprocated in opposite directions, and by means of suitable solder-feeding mechanism the sticks of solder are fed against the rotating cans, which are previously heated in order to melt the wire of solder.

As the present application does not concern the detailed construction and operation of the two parts of the apparatus for placing the tops and bottoms upon cans and for soldering the same, it is thought that further detailed description of the parts for accomplishing these ends is not necessary.

The power which is applied to the mechanism for applying the tops and bottoms of the cans is conveyed from the shaft C, upon which the pinion-wheel $J^2$ is mounted, and through the intermeshing wheels J' and J J to the shaft upon which the skeleton wheel is mounted. Keyed to the shaft $A^{12}$ is a bevel-gear $A^{19}$, which meshes with the bevel-gear $A^{20}$, whereby motion is conveyed from the main operating-shaft to the pinion $A^{16}$, which drives the gear-wheel $A^7$.

In operation the body portions of the cans are pushed off from the former onto the arm L. As the shaft C, carrying the cam-wheel Q, rotates the antifriction-wheel traveling in the groove of said cam will cause the arm L to be thrown toward the open jaws traveling about the circumference of the octagonal wheel. As the can K is fed to a location between two of the pivotal jaws G, the latter upon their upward movement are caused to partially close, as will be observed upon reference to our application, referred to, Serial No. 97,907. When the body portion of the can arrives at its highest position, where it receives its top and bottom, it is securely clamped and held until it begins to descend upon the opposite side, and by reason of the jaws being controlled by a cam keyed to the shaft on which the wheel carrying the jaws is mounted the can will be released and will be deposited upon the upper concaved end of arm T and will be carried by said arm to a position shown in Fig. 5 of the drawings, where it will be caught by the clamping-jaws, which are thrown against the top and bottom of the can as the cans travel up over the sprocket-wheel $A^×$ immediately before the soldering is effected. The can which has been deposited by the arm T upon the endless carrier conveys the can to locations where the soldering of the tops and bottoms is effected, after which the can is deposited from the clamping-jaws holding the same at one end of the carrier.

Having thus fully described our invention, what we claim as new, and desire to secure by Letters Patent, is—

1. In a can-making machine, a mandrel on which the body portion of a can is formed, a transferring-arm mounted to swing at right angles to the length of said former, and means for depositing a can-body upon said arm, as set forth.

2. In a can-making machine, a mandrel on which the body portions of cans are formed, a transferring-arm mounted to swing at right angles to the length of said former, the upper free end of said arm being concaved and adapted to swing so that said concaved portion will be in alinement with the former and designed to receive a can-body, and means for depositing the can-body upon said arm, as set forth.

3. In a can-making machine, the combination with a rotary carrier carrying clamping means for holding the body portions of cans, oscillating transferring-arms with their free ends positioned at locations diametrically opposite with reference to said carrier, and means for actuating said arms simultaneously to convey a body portion of a can to the carrier and transfer a can with the top and bottom applied thereto from the carrier, as set forth.

4. In a can-making machine, a rotary can-body carrier, clamping-jaws mounted thereon, oscillating can-transferring arms with their free ends concaved, and positioned at locations diametrically opposite each other with reference to said carrier, pivotal link connections between said arms, and means for actuating the same, whereby a can-body is fed to the rotary carrier simultaneously with the removal of a can with top and bottom applied thereto from the carrier, as set forth.

5. In a can-making machine, a mandrel on which the body portions of cans are formed, an apparatus for applying the tops and bottoms thereto, mechanism for soldering the same, oscillating transferring-arms with pivotal link connections, whereby said arms simultaneously convey a can-body from said former to the mechanism where its top and bottom are applied, and transfer the can with the top and bottom thereon, to the mechanism for soldering the can, as set forth.

6. In a can-making machine, a mandrel on which the body portions of cans are formed, apparatus for applying the tops and bottoms thereto, mechanism for soldering the same, oscillating arms for simultaneously transferring a can-body from said former, to the apparatus for applying the top and bottom, and conveying the can with its top and bottom onto the mechanism for soldering the same, as set forth.

7. In a can-making machine, a mandrel on which the body portions of cans are formed, apparatus for applying the tops and bottoms thereto, a rotary carrier with clamping-jaws thereon, and means for applying tops and bottoms to the can-bodies, a mechanism for soldering the tops and bottoms, and transferring-arms moving simultaneously to convey a can-body from said former to said rotary carrier, and transfer a can with its top and bottom applied from the carrier to the soldering mechanism, as set forth.

8. In a can-making machine, a mandrel on which the body portions of cans are formed, apparatus for applying the tops and bottoms thereto, a rotary carrier with clamping-jaws thereon, and means for applying tops and bottoms to the can-bodies, a mechanism for soldering the tops and bottoms, and transferring-arms moving simultaneously to convey a can-body from said former to said rotary carrier, and transfer a can with its top and bottom applied from the carrier to the soldering mechanism, said clamping-jaws designed to lift the can off the transferring-arms, as set forth.

9. In a can-making machine, a mandrel on which the body portions of cans are formed, a rotary carrier with can-clamping jaws mounted thereon and means for applying the tops and bottoms on the cans as they move with said carrier, apparatus for soldering the tops and bottoms, transferring-arms designed to move simultaneously in opposite directions to convey a can-body from said former to said carrier and transfer a can with its top and bottom applied to the portion of the machine where it is soldered, as set forth.

10. In a can-making machine, a mandrel on which the body portion of a can is formed, a rotary carrier with clamping-jaws mounted thereon, means for applying the tops and bottoms to the cans, apparatus for soldering the same, oscillating transferring-arms with their free ends disposed at locations diametrically opposite each other with reference to said rotary carrier and designed to simultaneously convey a can-body from said mandrel to the rotary carrier and carry a can with its top and bottom applied thereto, from the carrier to the soldering apparatus, as set forth.

11. In a can-soldering machine, a mandrel on which the body portion of a can is formed, a rotary carrier with clamping-jaws mounted thereon, means for applying the tops and bottoms to the cans, apparatus for soldering the same, oscillating transferring-arms with their free ends concaved, and disposed at locations diametrically opposite each other with reference to said carrier, and designed to simultaneously convey a can-body to said carrier from said mandrel, and transfer a can with its top and bottom applied thereto, from the carrier to can-soldering mechanism, as set forth.

12. In a can-making machine, a mandrel about which the body portion of a can is formed, a rotary carrier with clamping-jaws thereon, and means for applying the tops and bottoms to the can-bodies, parallel and vertically-disposed plates positioned on opposite sides of said carrier, oscillating transferring-arms, the upper free ends of which are designed to alternately pass between the opposite ends of said plates in conveying a can-body from said mandrel to mechanism for applying the tops and bottoms, and transferring a can with its top and bottom onto mechanism where they are soldered, as set forth.

13. In a can-making machine, the combination with the mandrel about which the can-body is formed, means for applying the tops and bottoms to the can-bodies, an oscillating transferring-arm, and means for pushing a can-body off said mandrel onto said transferring-arm, whereby said can-body may be conveyed to mechanism for applying the top and bottom to the body portion of the can, as set forth.

14. In a can-making machine, the combination with a mandrel about which the can-body is formed, mechanism for applying the tops and bottoms to the cans, an oscillating transferring-arm, a pivoted forked arm adapted to engage the end of a can-body and push the same off the mandrel onto said transferring-arm, as set forth.

15. In a can-making machine, the combination with the mandrel about which the can-body is formed, mechanism for applying the tops and bottoms to the can-bodies, an oscillating transferring-arm, means for operating the same, an arm, the end of which engages a longitudinal recess in said mandrel, and means for actuating said arm, whereby a can-body is pushed off the end of said mandrel onto said transferring-arm, as set forth.

In testimony whereof we affix our signatures in presence of two witnesses.

JOHN G. REHFUSS.
MARTIN O. REHFUSS.

Witnesses:
J. B. JARDELLA,
HENRY PEMINGTON.